US009195251B2

(12) United States Patent
Mauder et al.

(10) Patent No.: US 9,195,251 B2
(45) Date of Patent: Nov. 24, 2015

(54) CONTROLLED POWER FACTOR CORRECTION CIRCUIT

(71) Applicant: Infineon Technologies Austria AG, Villach (AT)

(72) Inventors: Anton Mauder, Kolbermoor (DE); Franz Hirler, Isen (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 370 days.

(21) Appl. No.: 13/751,190

(22) Filed: Jan. 28, 2013

(65) Prior Publication Data

US 2014/0210428 A1    Jul. 31, 2014

(51) Int. Cl.
*G05F 1/56* (2006.01)
*G05F 1/70* (2006.01)

(52) U.S. Cl.
CPC *G05F 1/70* (2013.01); *Y02B 70/126* (2013.01)

(58) Field of Classification Search
USPC .......................... 323/210, 266, 271–289, 351
See application file for complete search history.

(56) References Cited

U.S. PATENT DOCUMENTS

2012/0081936 A1*  4/2012  Walters ........................ 363/80
2014/0367772 A1   12/2014  Mauder et al.

OTHER PUBLICATIONS

Laszlo Huber et al. "Performance Evaluation of Bridgeless PFC Boost Rectifiers", Delta Products Corporation, 2007 IEEE, pp. 165-171.
Yungtaek Jang et al., "A Bridgeless PFC Boost Rectifier With Optimized Magnetic Utilization", IEEE Transactions on Power Electronics, vol. 24, No. 1, Jan. 2009, pp. 85-93.

\* cited by examiner

*Primary Examiner* — Adolf Berhane
*Assistant Examiner* — Nusrat Quddus

(57) ABSTRACT

In various embodiments a circuit arrangement is provided which may include: a first AC input node and a second AC input node; a first electronic switching device coupled between the first AC input node and an output node; a second electronic switching device coupled between the second AC input node and the output node; an inductor coupled between the first electronic switching device and the second electronic switching device; a controller configured to control the first electronic switching device and the second electronic switching device to, in a first mode, provide a first current path from the first AC input node to the output node via the inductor in a first current flow direction through the inductor; and, in a second mode, provide a second current path from the second AC input node to the output node via the inductor in a second current flow direction through the inductor, the second current flow direction being different from the first current flow direction.

25 Claims, 5 Drawing Sheets

CONTROLLED POWER FACTOR CORRECTION CIRCUIT

TECHNICAL FIELD

Various embodiments relate generally to a power factor correction circuit.

BACKGROUND

For electronic applications with loads above 75 Watts a PFC (power factor correction) stage is mandatory. For electronic applications in some other fields, like e.g. in the field of lighting technology this is already the case at smaller loads. Power factor correction means that the wave shape of the current drawn by a load from the mains has a substantially sinusoidal form with a very small or no phase shift at all with respect to the wave shape of the mains voltage. The harmonic content is also required to stay below a certain threshold.

Common applications with PFC functionality mostly include a diode-based full wave rectifier which, for example in the case of a boost converter, supplies current to an output capacitor via an inductor and a further diode. A switch coupled between the inductor and the diode is employed in order to keep the drawn current in phase with the mains voltage. One of the disadvantages of such systems is that the relatively large output capacitor is charged via three rectifying elements during operation which leads to substantial losses. Until its voltage reaches the mains peak voltage, a precharging takes place and this precharging process entails large pulse currents which also flows at least through the rectifying diodes leading to high current stress to the system.

Alternative concepts aiming at reducing bridge rectifier losses rely on costly SiC and/or GaN switches or replace rectifiers with active rectifying schemes. However, those approaches lead to high costs which render them rather unattractive for circuit manufacturers, even though the efficiency of such circuits in relation to the reduction of losses may be improved.

SUMMARY

In various embodiments a circuit arrangement is provided which may include: a first AC input node and a second AC input node; a first electronic switching device coupled between the first AC input node and an output node; a second electronic switching device coupled between the second AC input node and the output node; an inductor coupled between the first electronic switching device and the second electronic switching device; a controller configured to control the first electronic switching device and the second electronic switching device to, in a first mode, provide a first current path from the first AC input node to the output node via the inductor in a first current flow direction through the inductor; and, in a second mode, provide a second current path from the second AC input node to the output node via the inductor in a second current flow direction through the inductor, the second current flow direction being different from the first current flow direction.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Figure 1:
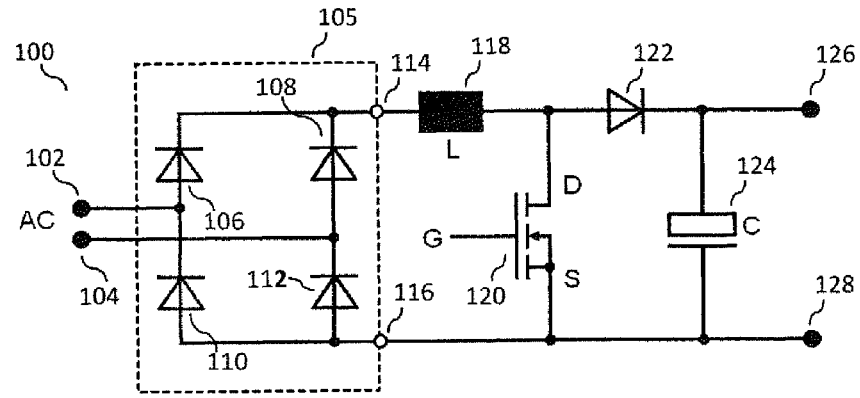
FIG. 1 shows a common PFC circuit.

In FIG. 1 a schematic of a common PFC circuit 100 is shown which in this exemplary case corresponds to a boost converter. The circuit 100 includes a first input terminal 102 and a second input terminal 104. Both input terminals 102, 104 are coupled to a diode based full wave rectifier 105 including a first diode 106, a second diode 108, a third diode 110 and a fourth diode 112. The four diodes 106, 108, 110, 112, are arranged such that they form a full wave rectifier 105, a configuration well-known in the state of the art. The full wave rectifier 105 has a first output 114 which is coupled to one side of an inductor 118 and further has a second output 116 which is coupled to a first source/drain terminal of a transistor 120. The other side of the inductor 118 is coupled to a second source/drain terminal of the transistor 120 and to one side of a capacitor 124 via a fifth diode 122. The other side of the capacitor 124 is coupled to the first source/drain terminal of the transistor 120. The capacitor 124 is coupled in parallel between a first output terminal 126 and a second output terminal 128 of the circuit 100. Sometimes a Schottky diode may be used as the fifth diode 122. In the latter, the Schottky barrier leading to the knee voltage of the Schottky diode is also understood when describing the pn-threshold of the fifth diode 122.

During an initial start up process of the circuit 100 the capacitor 124 which serves as an output energy storage element is uncharged and hence needs to be precharged for proper operation. During that charging process the capacitor 124 is charged with current from the mains, that is with the current flowing from the first input terminal 102/or the second input terminal 104 of the rectifier to the first output 114 and then back through the second output 116 of the rectifier 105 back to the mains, when assuming a technical current flow direction. That charging process comes to an end when the voltage across the capacitor 124 reaches the peak voltage of the mains voltage applied to the first input 102 and/or the second input 104. Especially in the beginning of the start up process, when the capacitor 124 is practically uncharged, large pulse currents (so called inrush currents) occur which are conducted at least through two out of the four diodes 106, 108, 110, 112 contained in the full wave rectifier 105. In the case shown in FIG. 1 the inrush current may also flow through the inductor 118 and the fifth diode 122 causing high stress to all components involved. The high stress leads to high peak losses in the devices affected which do not really contribute to the efficiency of the circuit 100 but may require higher ratings of the devices affected. In some cases measures are taken to limit the precharge current. However, these measures cause additional effort and during normal operation the operation current is flowing through three PN-junctions leading to high continuous losses in the circuit 100 which deteriorates the efficiency of the circuit. In combination with modern high-voltage switches those three PN-junctions coupled in series may be seen to make the major contribution to the overall loss of the circuit 100.

A further issue which needs to be dealt with is the fact that during the start up process of the circuit 100 the high pulse currents are also flowing through the inductor 118. Those high pulse currents may cause the inductor 118 to saturate such that it does not operate with the calculated inductivity. This in turn may cause the circuit 100 to operate outside of its rated parameter range which is mostly laid out based on steady-state operation, i.e. when the capacitor 124 is already charged. However when designing the circuit 100, the initial start up phase needs to be considered and therefore electronic components with higher ratings (which are therefore more bulky and/or more expensive) may need to be used in order to also cover the operation range where inrush currents may occur. Last but not least those large inrush currents may lead to excessive heating of the four diodes 106, 108, 110, 112 contained in the full wave rectifier 105 and/or the fifth diode 122 and/or the inductor 118 eventually destroying one or more of those components. As a consequence additional efforts may be taken to limit the inrush current and/or to bypass at least the inductor 118 and/or the fifth diode 122.

Figure 2A:
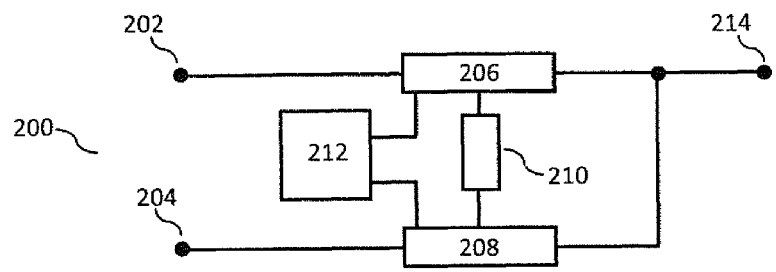
FIGS. 2A and 2B show implementations of the circuit arrangement according to various embodiments.

In FIG. 2A a schematic of a circuit arrangement 200 according to various embodiments is shown which provides a PFC circuit without the common rectifier. The circuit arrangement 200 according to various embodiments includes a first AC input node 202 and a second AC input node 204. A first electronic switching device 206 is coupled between the first AC input node 202 and an output node 214. A second electronic switching device 208 is coupled between the first AC input node 204 and the output node 214. An inductor 210 is coupled between the first electronic switching device 206 and the second electronic switching device 208. A controller 212 is coupled to the first electronic switching device 206 and to the second electronic switching device 208.

The first AC input node 202 and the second AC input node 204 may be provided to receive an AC voltage, for example the typical AC mains voltage of 230 V at 50 Hz in Europe, such that one AC input node may be coupled to the phase conductor of the mains and the other AC input node may be coupled to the neutral conductor of the mains. However, any other AC voltage with parameters different from the given example may be also used, as the circuit arrangement 200 may comply with those or be easily adjusted to those. The controller 212 may be any kind of software and/or hardware, for example an FPGA (field-programmable gate array) or an IC (integrated circuit), which is provided in the circuit arrangement 200 according to various embodiments to control the operation thereof. The first electronic switching device 206 and/or the second electronic switching device 208 may be composite switching devices including a plurality of switches. This aspect will be illustrated in more detail on the basis of the schematic shown in FIG. 2B. The controller 212 may be configured to control the state of first electronic switching device 206 or parts thereof (e.g. separate internal switches provided therein) and the second electronic switching device 208 or parts thereof (e.g. separate internal switches provided therein) such that a DC voltage (or equivalently a DC current) is provided at the output node 214. The controller 212 may operate the electronic switching devices such that, depending on the instantaneous phase of the AC mains voltage, different current paths through the circuit arrangement 200 according to various embodiments may be provided. The circuit arrangement 200 according to various embodiments may be seen to be based on the general concept that constant currents are easier to deal with (than alternating currents) in the field of power engineering as they may be readily guided or directed by adjusting the state of appropriate valves in a respective circuit which in the field of electronics are equivalent to (power) switches, diodes and so forth. Point overload of those valves due to current peaks, for example current peaks occurring in the process of charging of a capacitor, may be principally avoided.

As already mentioned, the circuit arrangement 200 according to various embodiments may take on different configurations depending on the instantaneous phase of the AC voltage applied to the circuit arrangement 200. The controller 212 may be configured to operate the circuit arrangement 200 according to various embodiments in a first mode, when the potential at the first AC input node 202 is larger than the potential at the second AC input node. The controller 212 may be configured to operate the circuit arrangement 200 according to various embodiments in a second mode, when the potential at the first AC input node 202 is smaller than the potential at the second AC input node. In simple terms the circuit arrangement 200 according to various embodiments may be switched between the first mode and the second mode approximately at every zero crossing of the AC input voltage provided at the first AC input terminal 102 and/or the second AC input terminal 104. The first mode and the second mode may correspond to different configurations of the first electronic switching device 206 and the second electronic switching device 208 which, as already mentioned, may be composite switches. At this point of the description suffice it to say that the first electronic switching device 206 and the second electronic switching device may each include two separate switches coupled in series. The each of the two ends/sides of the inductor 210 may be coupled to the electric path between the two separate switches within one electronic switching device.

The first mode may include two states, wherein during a first state a current path between the first AC input node 202 and the second AC input node 204 leading through the first electronic switching device 206, the inductor 210 and the second electronic switching device 208 may be provided. During a second state a current path between the first AC input node 202 and the output node 214 leading through the first electronic switching device 206, the inductor 210 and the second electronic switching device 208 may be provided. In the first mode the current flow direction through the inductor 210 is the same during both states. The first state of the first mode may correspond to a state of a boost converter, in which the inductor current increases and energy is stored in the magnetic field of the inductor. The second state of the first mode may correspond to a state of a boost converter, in which the inductor current is directed through a free wheeling diode towards a load such that the energy stored in the magnetic field of the inductor may be effectively transferred to the load (or to a capacitor provided at the output of the corresponding boost converter). The difference between the first state and the second state of the first mode is that during the first state the output node 214 is electrically isolated from the first AC input node 202 and the second AC input node 204. During the second state of the first mode the energy stored in the magnetic field of the inductor 210 is transferred to the output node 214. During the first state and the second state of the first mode the controller 212 may be configured to control the first electronic switching device 206 and the second electronic switching device 208 (e.g. the separate switches provided therein) such that the different current paths described above may be realized within the circuit arrangement 200 according to various embodiments. During operation in the first mode the circuit arrangement 200 according to various embodiments may alternate between the first state and the second state at a switching frequency which may approximately lie in the range between 30 kHz and 300 kHz, for example at 50 kHz or for example at 120 kHz, or in some cases even above 300 kHz. However, during the first mode, the circuit arrangement 200 may be also operated at variable frequencies, for example in the range specified above. In addition, during some period of time, e.g. at low load or in standby operation, the switching frequency may be even set down to 0 Hz.

The second mode may be seen as an inversion of the first mode, as both modes are mainly governed by the polarity of the AC input voltage provided at the first AC input node 202 and the second AC input node 204. Therefore, in analogy to the first mode, the second mode may also include two states, wherein during the first state a current path between the first AC input node 202 and the second AC input node 204 leading through the first electronic switching device 206, the inductor 210 and the second electronic switching device 208 may be provided and wherein during the second state a current path between the second AC input node 204 and the output node 214 leading through the first electronic switching device 206, the inductor 210 and the second electronic switching device 208 may be provided. In the second mode the current flow direction through the inductor 210 is the same during both states, however, the current flow direction through the inductor 210 during the second mode is opposite to the current flow direction through the inductor 210 during the first mode due to the fact that the polarity of the AC input voltage during the first mode is inverted with respect to the polarity of the AC input voltage during the second mode. Other than that, the first state and the second state of the second mode may be seen to be equivalent to the first state and the second state of the first mode. That is, the first state of the second mode may correspond to a state of a boost converter, in which the inductor current increases and energy is stored in the magnetic field of the inductor. The second state of the second mode may correspond to a state of a boost converter, in which the inductor current is directed through a free wheeling diode towards a load such that the energy stored in the magnetic field of the inductor may be effectively transferred to the load (or to a capacitor provided at the output of the corresponding boost converter). The difference between the first state and the second state of the second mode is that during the first state the output node 214 is electrically isolated from the first AC input node 202 and the second AC input node 204, very much in analogy to the first state of the first mode. During the second state of the second mode the energy stored in the magnetic field of the inductor 210 is transferred to the output node 214. During the first state and the second state of the second mode the controller 212 may be configured to control the first electronic switching device 206 and the second electronic switching device 208 (e.g. the separate switches provided therein) such that the different current paths described above may be realized within the circuit arrangement 200 according to various embodiments. During operation in the second mode the circuit arrangement 200 according to various embodiments may alternate between the first state and the second state at a switching frequency which may approximately lie in the range between 30 kHz and 300 kHz, for example at 50 kHz or for example at 120 kHz, or even above 300 kHz, and thus be equivalent to the switching frequency of the alteration between the first state and the second state in the first mode. However, during the second mode, the circuit arrangement 200 may be also operated at variable frequencies, for example in the range stated above. In addition, during some period of time, e.g. at low load or in standby operation, the switching frequency may be even set down to 0 Hz.

The circuit arrangement according to various embodiments may include further configurations of the first electronic switching device 206 and the second electronic switching device 208 which correspond to further modes. Those additional modes will be described on the basis of further embodiments of the circuit arrangement presented in the following figure.

Figure 2B:
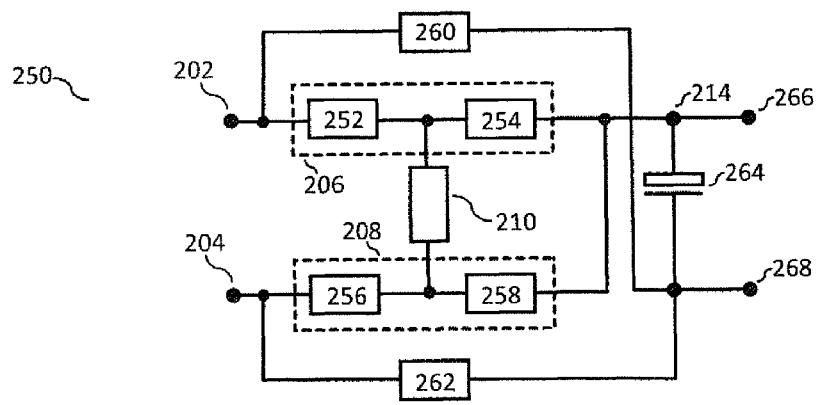

In FIG. 2B a further implementation 250 of the circuit arrangement according to various embodiments is illustrated which may be seen to correspond to an extended and more detailed implementation of the circuit arrangement 200 according to various embodiments shown in FIG. 2A. The same elements having been labelled with the same reference numbers and will not be described again. Based on the circuit arrangement 200 shown in FIG. 2A, only additional features or elements illustrated in more detail will be set out. The controller 212 is not displayed in the figure.

The circuit arrangement 250 according to various embodiments is based on the embodiment already shown in FIG. 2A. However, the first electronic switching device 206 and the second electronic switching device are illustrated in more detail. The first electronic switching device 206 includes a first switch 252 and a second switch 254 which are coupled in series with one another. One end/side of the inductor 210 is coupled to the electrical path between the two switches 252, 254. In analogy, the second electronic switching device 206 includes a third switch 256 and a fourth switch 258 which are also coupled in series with one another. The other end/side of the inductor 210 is coupled to the electrical path between the two switches 256, 258. In addition, the circuit arrangement 250 according to various embodiments includes a capacitor 264, wherein one side of the capacitor 264 is coupled to the output node 214 and to a first output node 266 and wherein the other side of the capacitor 264 is coupled to the second output node 268. A fifth switch 260 is provided, coupled between the second output node 268 and the first AC input node 202, and a sixth switch 262 is provided, coupled between the second output node 268 and the second AC input node 204.

In the following, the active conducting paths through the circuit arrangement 250 according to various embodiments in first mode and in second mode will be described. During the first state of the first mode, a current path between the first AC input node 202 and the second AC input node 204 is provided, leading through the first switch 252, the inductor 210 and the third switch 256, such that energy is stored in the magnetic field of the inductor 210 by the current flowing therethrough. During the second state of the first mode, a current path between the first AC input node 202 and the second AC input node 204 is provided, leading through the first switch 252, the inductor 210, the third switch 258, the output node 214, the capacitor 264 and the sixth switch 262, such that the current may charge the capacitor 264. The charge in the capacitor may be used to supply a load connected to the first output node 266 and to the second output node 268. The direction of the current flow through the inductor 210 is the same during both states of the first mode. The circuit arrangement 250 according to various embodiments may be switched from the first state to the second state by deactivating the third switch 256 and simultaneously activating the fourth switch 258. This process may be controlled by the controller (not shown in FIG. 2B) and take place at the switching frequency, as described above. In other words, in the first mode, either the third switch 256 or the fourth switch 258 is conducting in a mutually exclusive manner depending on the state in which the circuit arrangement 250 is in, whereas the first switch 252 may remain switched on and therefore conduct current during each of the two states of the first mode. The second switch 254 may remain switched off during the first mode.

It is to be noted that the switching between the first mode and the second mode may take place by only switching one switch in an active manner in a corresponding electronic switching device. Assuming operation in the first mode, in one alternative, the third switch 256 and the fourth 258 switch may be both transistors. In that case, both transistors are switched actively by providing a proper potential at their gate terminals. In the second alternative, the third switch 256 may be a transistor whereas the fourth 258 switch may be a diode. In that case, only the transistor needs to be switched actively (e.g. it may be operated in a clocked manner, i.e. switched on and switched off with the switching frequency, as the diode will be conducting once the transistor has been switched off. In other words, the diode will automatically conduct the current, when the transistor is switched off and vice versa. The scenario just described also applies to the first switch 252 and the second switch 254 in the first electronic switching device 206 during the operation of the circuit arrangement 250 according to various embodiments in the second mode.

The circuit arrangement 250 according to various embodiments may further operate in a third mode and a fourth mode. Those two modes which will be described in the following may be used when the circuit arrangement 250 is powered on and the capacitor 264 needs to be (pre)charged as it may be free of charges or carries a negligible amount of charges. That is a situation in which inrush currents usually occur in an ordinary PFC stage. In analogy to the first mode and the second mode, the third mode differs from the fourth mode in that the polarities of the AC input voltage are different, other than that those two modes feature functional symmetry. That is, during (pre)charging of the capacitor 264 the third mode may be used when the potential at the first AC input node 202 is larger than the potential at the second AC input node 204 and the fourth mode may be used when the potential at the second AC input node 204 is larger than the potential at the first AC input node 202. Each of the third mode and the fourth mode may be realized in two alternatives. In the following, only the third mode will be described in more detail.

In the third mode, the capacitor 264 may be initially negligibly charged or practically not charged at all. A current path is provided between the first AC input node 202 and the second AC input node 204 leading through the first switch 252, the inductor 210, the fourth switch 258, to the capacitor 264 and from the capacitor 264 through the sixth switch 262 to the second AC input node 204. In a first alternative of the (pre)charging scenario, the first switch 252 and/or the sixth switch 262 may be operated in a clocked manner, i.e. switched on and switched off. The inductor 210 is used to limit the current increase during pre-charging of the capacitor 264 when the first switch 252 and the sixth switch 262 are both turned-on. When the maximum permissible current in the inductor 210 is reached, e.g. the first switch 252 and/or the sixth switch 262 may be turned off and the current through the inductor 210 is reduced in the free wheeling path using the elements second switch 254, fourth switch 258 and optionally the capacitor 264 and the AC input nodes 202 and 204. The first switch 252 and/or sixth switch 262 may be operated with a frequency typically in the range between approximately 30 kHz and approximately 300 kHz, or even above 300 kHz. The frequency range may be the same as in the first and second mode described above. However, the duty cycle of the first switch 252 and/or the sixth switch 262, that is the portion of the period during which the first switch 252 and/or sixth switch 262 are turned on (i.e. in conductive state), may be controlled in a manner that a maximum current through the inductor 210 is not exceeded. However, this is only an example. In another example, the frequency during the third mode may differ from the frequency in the first and second mode. During the third mode, the circuit arrangement 250 may be operated also at variable frequencies, for example in the frequency range as stated above. In a second alternative, the first switch 252 may be also switched on, when the potential at the first AC input node 202 starts to rise. Thus the current through the first switch 252 rises with the positive potential at the first AC input node 202. A high pulse current may occur when there is no synchronous turn-on of the first switch 252 but an arbitrary start of operation, e.g. at a moment when there is already a high positive potential at the first AC input node 202. Prior to the start of operation (e.g. prior to an initial powering on of the circuit arrangement 250 according to various embodiments), the capacitor 264 may be practically uncharged representing a short circuit for a short period of time at the start of operation. The corresponding sixth switch 262 may be switched on in advance or may be operated synchronously with the first switch 252. The difference between the first alternative and the second alternative is that the first alternative is based on a clocked operation of the first switch 252 whereas in the second alternative the first switch may remain switched on for the duration of the positive half-wave of the AC input voltage at the first AC input node 202. In both alternative scenarios of the third mode, the second electronic switching device 208, i.e. the third switch 256 and the fourth switch 258 remain switched off. Using any one of the two alternatives the capacitor 264 may be (pre)charged to a voltage corresponding to the peak voltage of the AC input voltage applied to the circuit arrangement 250 according to various embodiments. When the second alternative is used, the normal operation of the circuit arrangement 250 according to various embodiments, i.e. the switching between the first mode and the second mode, may begin after the first AC input voltage peak, for example approximately 5 ms after powering on of the circuit arrangement 250 according to various embodiments or approximately 5 ms after the first zero-crossing of the AC input voltage, when an AC input voltage frequency of 50 Hz is assumed. In any case, the (pre)charging process of the capacitor 264 may be performed with a current which flows through the first electronic switching device 206 and the sixth switch 262, such that the inductor 210 is bypassed and therefore protected from the current charging the capacitor 264.

The difference between ordinary PFC circuits, such as the circuit 100 shown in FIG. 1, and the PFC circuit described herein in the form of the circuit arrangement according to various embodiments shown in FIG. 2A or FIG. 2B is that the inductor in ordinary PFC circuits is conducting the rectified unidirectional current provided by the rectifier. In contrast thereto, the inductor 210 in the circuit arrangement according to various embodiments is so to speak driven with the AC input voltage with the, for example 50 Hz or 60 Hz of the AC input voltage. In other words, the inductor 210 is conducting the AC input current which changes direction at twice the AC input voltage frequency and not the rectified unidirectional rectified current from a rectifier. Due to the changing direction of the current flow through the inductor 210 saturation effects of the magnetization may be practically prevented or at least drastically reduced.

The fourth mode, which will not be described in detail as it is equivalent to the third mode, also features two alternatives. In any case, the conductive path between the second AC input node 204 and the capacitor 264 is established through the second electronic switching device 208 including the third switch 256 and the fourth switch 258 and the output node 214 and then from the capacitor 264 through the fifth switch 260 to the first AC input node 202. The difference between the first alternative and the second alternative, in analogy to the difference between the alternatives of the third mode, is that in the first alternative the third switch 256 may be switched in a clocked manner during the third mode, whereas in the second alternative the third switch 256 is switched on when the potential at the second AC input node 204 rises, i.e. at a zero crossing of the AC input voltage, where the polarity of the voltage at the second AC input node 204 becomes positive with respect to the polarity of the voltage at the first AC input node 202.

In order to reduce switching losses, the fifth switch 260 and the sixth switch 262 may be switched with a relatively low frequency in the range between approximately 30 kHz and approximately 300 kHz in the first mode and in the second mode in order to shape the waveform of the drawn current in accordance with the AC input voltage. However this feature is an optional one. Accordingly, during the positive half-wave of the AC input voltage at the first AC input node 202 (i.e. in the first mode), that is when the potential at the first AC input node 202 is larger than the potential at that the second AC input node 204, the third switch 256 and the sixth switch 262 may remain continuously switched on, the first switch 252 may be driven in a clocked manner and the fifth switch 260 may remain switched off (non-conducting). During the negative half-wave of the AC input voltage at the first AC input node 202 (i.e. in the second mode), that is when the potential at the first AC input node 202 is smaller than the potential at that the second AC input node 204, the first switch 252 and the fifth switch 260 may remain continuously switched on, the third switch 256 may be driven in a clocked manner and the sixth switch 262 may remain switched off. Leaving the sixth switch 262 continuously on and the fifth switch 260 off during the time when a positive potential is applied to the first AC input node 202 and leaving the sixth switch 262 off and the fifth switch 260 continuously on when a positive potential is applied to the second AC input node 204 may be beneficial in regard to the electromagnetic interference caused by the circuit arrangement 250. This helps to reduce the filtering effort between the first and second AC input nodes 202, 204 and the public power grid (not shown in FIG. 2B) to which the circuit arrangement 250 according to various embodiments may be connected.

Figure 3A:
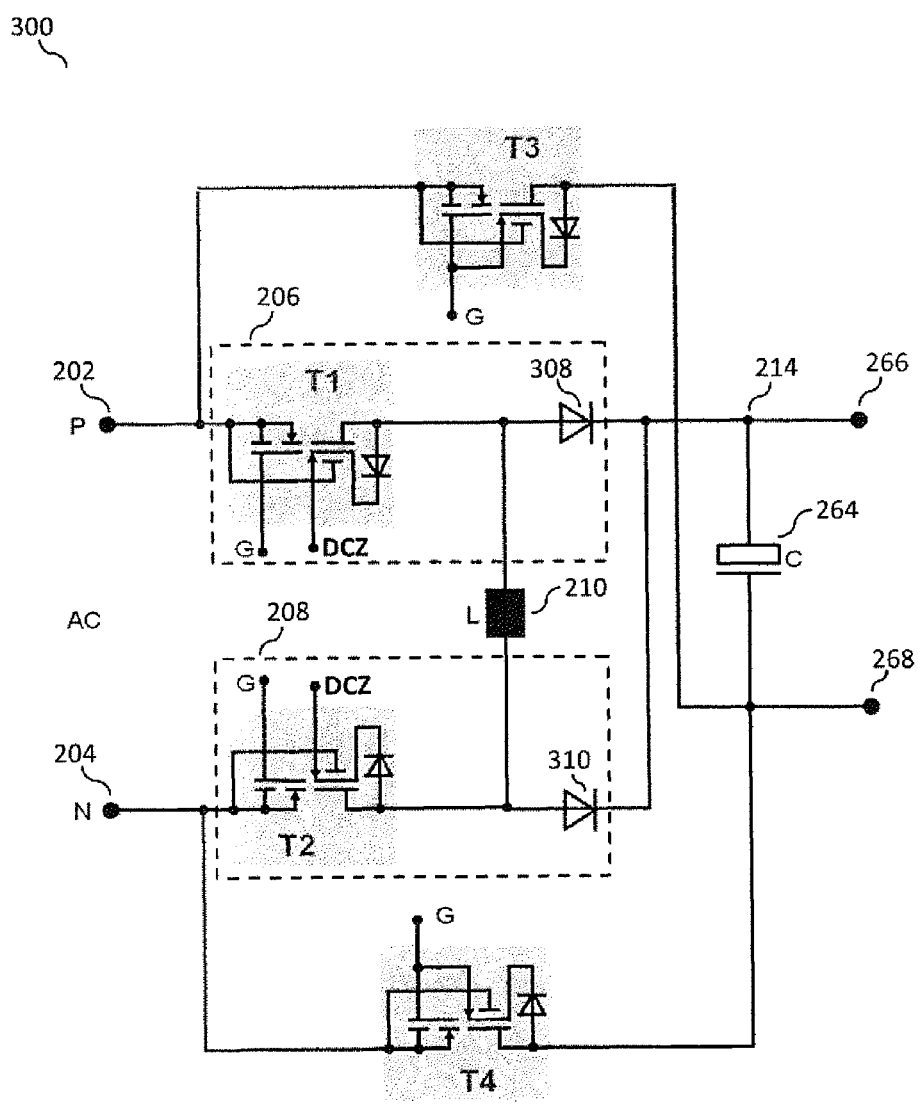
FIGS. 3A and 3B show further embodiments of the circuit arrangement.

In FIG. 3A an implementation 300 of the circuit arrangement according to various embodiments is shown. The circuit arrangement 300 according to various embodiments is based on the implementation shown in FIG. 2B such that the same elements have been numbered with the same reference numbers. All aspects mentioned with respect to the implementation of the circuit arrangement 250 according to various embodiments shown in FIG. 2A also apply to the implementation shown in FIG. 3A and therefore they will not be described again. In particular, the circuit arrangement 300 according to various embodiments can be operated in any one of the four modes already described.

The switches contained in the first electronic switching device 206 and the second electronic switching device 208 are shown in more detail in FIG. 3A. As shown in the exemplary implementation, both electronic switching devices 206, 208 may have the same structure. That is, the first electronic switching device 206 includes a first transistor T1 which corresponds to the first switch 252 from FIG. 2B and a first diode 308 which corresponds to the second switch 254 from FIG. 2B. In analogy, the second electronic switching device 208 includes a second transistor T2 which corresponds to the third switch 256 from FIG. 2B and a second diode 310 which corresponds to the fourth switch 258 from FIG. 2B. As can be seen, each end/side of the inductor 210 is coupled to an electrical path connecting the transistor with the corresponding diode in each of the electronic switching devices 206, 208. The fifth switch 260 from FIG. 2B and the sixth switch 262 from FIG. 2B are both implemented as transistors, i.e. as a third transistor T3 and as a fourth transistor T4, respectively, in this exemplary embodiment 300 of the circuit arrangement.

In the embodiment of the circuit arrangement 300 shown in FIG. 3A the first transistor T1 and the second transistor T2 are configured as bidirectionally isolating high voltage transistors. In the scope of this description the feature of bidirectional isolation implies that the transistor, e.g. the respective transistor, may be rendered isolating independent of the polarity of the voltage applied between its two terminals. In order to provide that functionality, the first transistor T1 and the second transistor T2 may be configured as TEDFETs (trench extended drain field-effect transistor). A TEDFET may be seen as a special configuration of vertical MOSFET (metal-oxide field effect transistor). Its distinguishing feature is a drift control zone which is arranged adjacent to a the drift zone of the device, wherein the drift control zone is electrically insulated from the drift zone by a dielectric layer separating the drift zone from the drift control zone which extends deeply into the semiconductor material of the transistor. The gate terminal is labelled with G and the drift control zone terminal is labelled with DCZ. A voltage may be applied to both terminals independent from one another. A TEDFET does not suffer from the parasitic conductivity provided in one direction by the inherent body diode of a single ordinary MOSFET. Therefore, depending on the potentials applied to the gate terminal G and the drift control zone terminal DCZ the TEDFET may be put into a conducting state or into a non-conducting state independent of the polarity of the voltage applied between its two source/drain terminals. Alternatively, bidirectional isolation of the first switch 252 and the third switch 256 may be provided by switches each including two MOSFETs which are coupled in series with their source terminals or their drain terminal is coupled to one another. Thereby, an arrangement is obtained where the forward direction of the body diode of the one MOSFET is opposite to the forward direction of the body of the other MOSFET. Such an arrangement of two MOSFETs also provides be directional isolation as for both possible polarities of the voltage applied to between the two outer source/drain terminals (i.e. the two source/drain terminals not coupled to one another) there will be always one body diode which is back-biased and therefore electrically isolating.

In the embodiment of the circuit arrangement 300 shown in FIG. 3A each of the first switch T1 and the second switch T2 in connection with the inductor 210 may be seen to fulfil the role of a current source which is modulated with the frequency equivalent to the frequency of the AC input voltage, for example 50 Hz or 60 Hz. As already mentioned with respect to FIG. 2, the first switch T1 included in the first electronic switching device 206 is constantly active during both states of the first mode and the second switch T2 included in the second electronic switching element 208 is constantly active during both states of the second mode, wherein the switching between the first mode and the second mode takes place in synchronicity with the alteration of the polarity of the AC input voltage.

It is to be noted that even though the second switch 254 and the fourth switch 258 are implemented as diodes 308, 310, they may just as well be implemented as transistors which are driven in asynchronicity with the first switch 250 (e.g. first transistor T1) and the third switch 256 (e.g. second transistor T2), respectively. That is, assuming an operation in the first mode, the transistor replacing the second diode 310 may be switched on during the second state when the third switch 256 is switched off and it may be switched off during the first state when the third switch 256 is switched on. In the following, it is assumed that the second switch 254 and the fourth switch 258 are configured as diodes 308, 310 keeping in mind that they may be also configured as transistors.

During operation, the capacitor 264 which may serve as an DC voltage link is only charged when the first switch 252 (e.g. the first transistor T1) and the sixth switch 262 (e.g. the fourth transistor T4) in the first mode or the third switch (e.g. the second transistor T2) and the fifth switch 260 (e.g. the third transistor T3) in the second mode are switched on. An uncontrolled peaking or rising of the current flowing through the inductor 210 and the respective diode, i.e. the first diode 308 and the second diode 310, may be prevented. In comparison to an ordinary PFC stage, for example the circuit 100 shown in FIG. 1, the problem of high inrush currents does not occur and therefore measures against it do not have to be taken. The inductor 210 and the two diodes 308, 310 may be rather laid out for a maximum adjustable nominal current which may increase the overall energy efficiency and reduce costs.

The first switch 252 and the third switch 256 in the exemplary implementation of the circuit arrangement 300 shown in FIG. 3A are configured as bidirectionally isolating high voltage switches in the form of TEDFETs. The bidirectional isolation is required for the current limiting functionality which is used in the third mode and in the fourth mode. If instead of a bidirectionally isolating first switch 252 a unidirectionally isolating switch (e.g. an ordinary MOSFET with the inherent body diode) would be used, it would not be possible to effectively connect and disconnect the capacitor 264 from the first AC input node 206 in the third mode and thereby limit the inrush current during the precharging phase of the capacitor 264. In the case where the feature of the current limitation is not of primary importance, the bipolar isolating switches (i.e. the first transistor T1 and the second transistor T2) may be replaced with unidirectionally isolating elements, for example ordinary MOSFETs with body diodes witch inherently provide a conductive path in one direction even if the transistor is switched off.

In the circuit arrangement 300 according to various embodiments shown in FIG. 3A the same reference potential may be used for driving the first transistor T1 and the second transistor T2 as well as the third transistor T3 and the fourth transistor T4. Therefore, the first transistor T1 and the second transistor T2 in FIG. 3A are implemented as TEDFETs with a drift control zone terminals and the third transistor T3 and the fourth transistor T4 are configured as EGFETs (extended gate field effect transistor), wherein there drift control zone is driven with the potential of the respective gate. Alternatively, the drift control zones of the first transistor T1 and the second transistor T2 may be generated or interconnected internally (for example by coupling the drift control zone terminal to the gate, possibly via a resistor) and or the third transistor T3 and the fourth transistor T4 may be configured as TEDFETs.

Since the third transistor T3 and the fourth transistor T4 are non-conducting during the respective half-waves of the AC input voltage, the driving circuitry for those transistors may provide a standby supply for the circuit arrangement 300 according to various embodiments. The operating power supply may be realized by capacitive coupling and rectifying of the voltage which is present at the drain terminals of the first transistor T1 and the second transistor T2.

Using the first switch T1 and the third switch T2 in connection with the inductor 210 as switchable current sources it is possible to provide the necessary voltage at the capacitor 264 even when a small AC input voltage is applied to the circuit arrangement 300 according to various embodiments and when only a small current is flowing through the inductor 210. Therefore, the circuit arrangement according to various embodiments is inherently provided with a wide range input, the upper range of which is defined by the blocking capacity of the used components. The circuit arrangement according to various embodiments is therefore easily adapted for operation with AC input voltages in the range between approximately 90 V and approximately 250 V at, for example, 50 Hz or 60 Hz.

The capacitor 264 is included in the circuit arrangement 300 according to various embodiments shown in FIG. 3A and acts as a buffer or as a DC voltage link in order to provide a sufficient amount of power to a load which may be coupled to the first output terminal 266 and the second output terminal 268 when the AC input voltage is low. In cases where the ability to buffer energy is provided in the load, the capacitor 264 may be omitted or it can be replaced by a component with a low capacitance, for example a foil capacitor instead of an electrolytic capacitor.

Figure 3B:
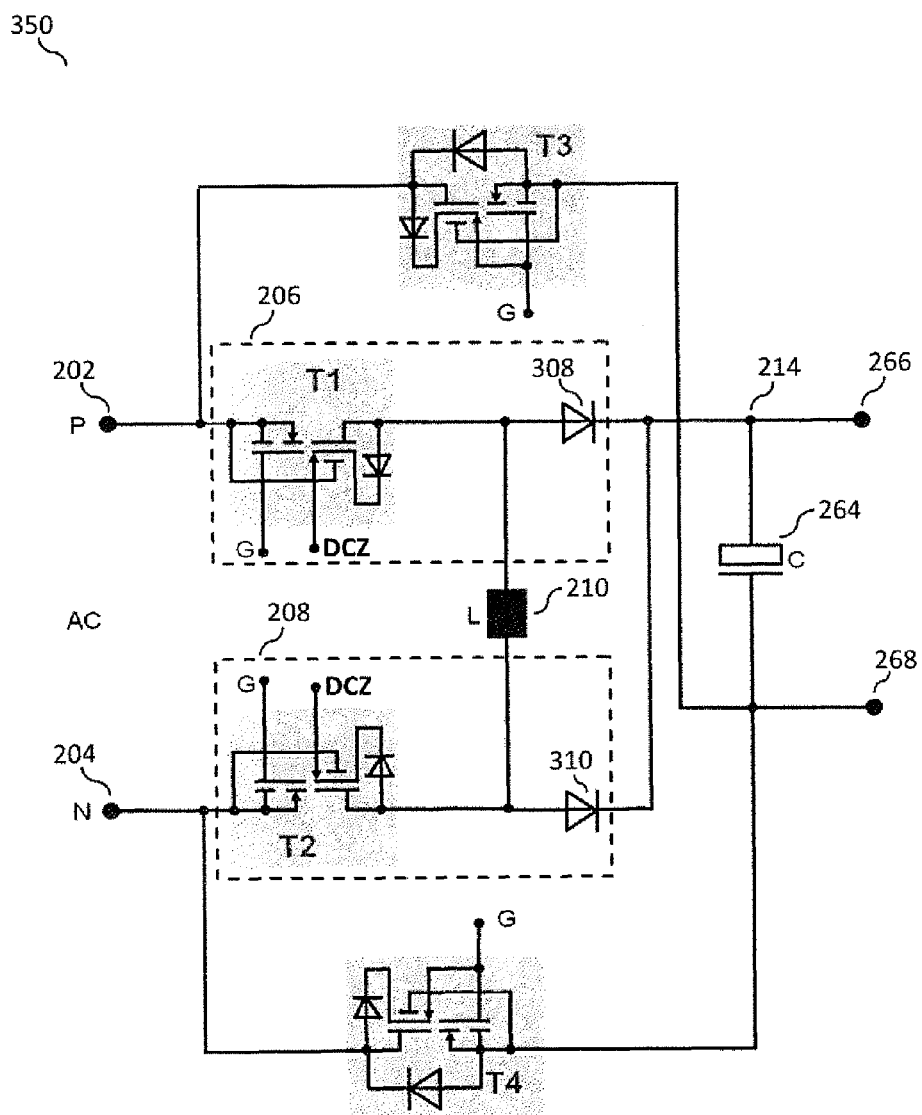

In FIG. 3B a further implementation 350 of the circuit arrangement according to various embodiments is illustrated which is very similar to the embodiment of the circuit arrangement shown in FIG. 3A. In FIG. 3B the third transistor T3 and the fourth transistor T4 are implemented as unidirectionally isolating transistors, as indicated by the body diodes which provide parasitic conduction in one direction (when the forward voltage exceeds the corresponding forward bias voltage). In that case the third transistor T3 and the fourth transistor T4 may have a common source reference potential which is different from the source reference potential of the first transistor T1 and the second transistor T2. If higher forward power losses are not of primary concern, the third transistor T3 and the fourth transistor T4 in FIG. 3B may be also replaced by diodes, their forward direction aligned with the forward direction of the body diodes of those transistors as indicated in FIG. 3B.

Figure 4:
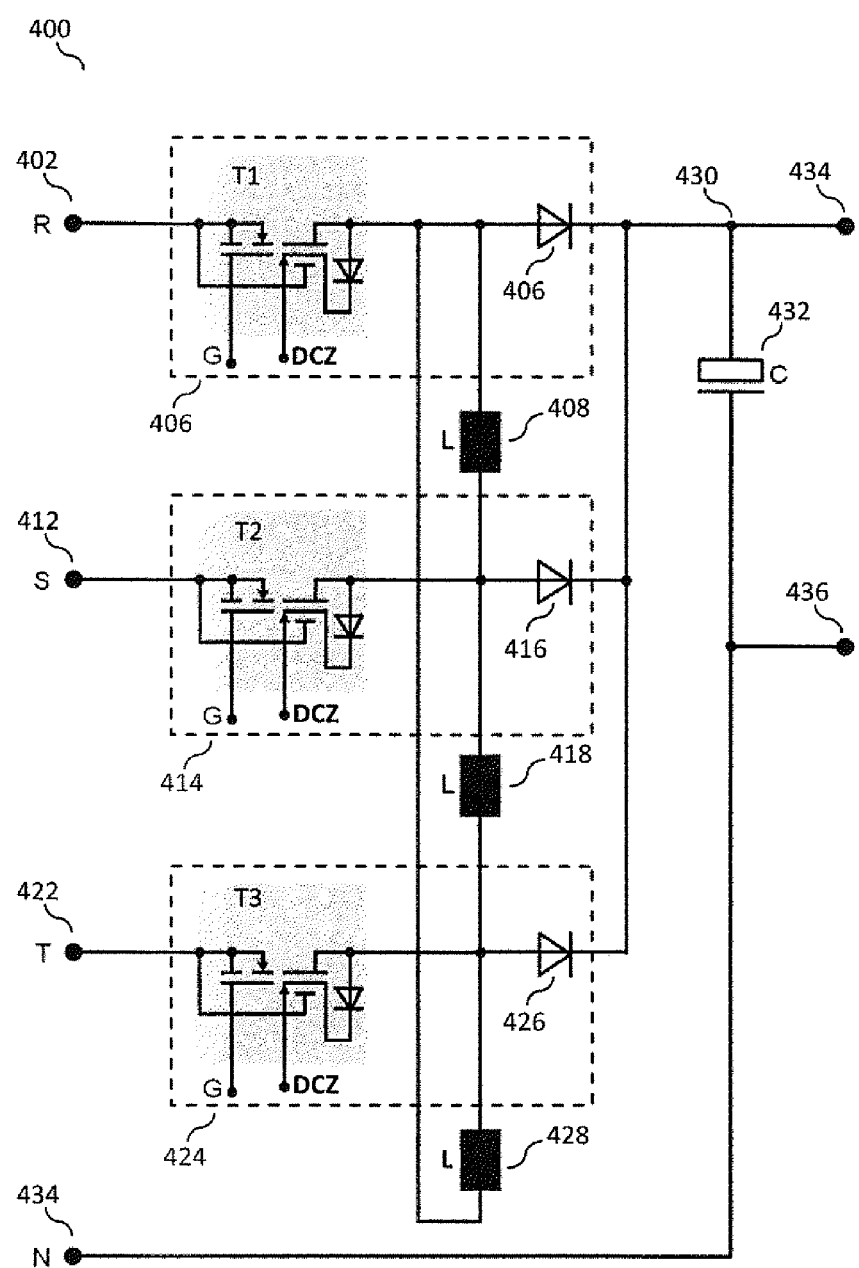
FIG. 4 shows a further embodiment of the circuit arrangement in a three-phase electric power configuration.

In FIG. 4 a further implementation of the circuit arrangement according to various embodiments is shown. As the implementation shown in FIG. 4 is configured for operation in combination with a three phase electric power supply, it includes three branches, each branch having the same structure which is based on the concept already described with reference to FIGS. 2A and 2B and FIGS. 3A and 3B. The first branch includes a first electronic switching device 406 coupled between a first AC input node 402 and the output node 430. The first electronic switching device 406 includes a series arrangement of a first transistor T1 coupled to a first diode 406, wherein one end of a first inductor 408 is coupled to the electrical path between the first transistor T1 and the first diode 406. The second branch includes a second electronic switching device 414 coupled between a second AC input node 412 and the output node 430. The second electronic switching device 414 includes a series arrangement of a second transistor T2 coupled to a second diode 416, wherein one end of a second inductor 418 is coupled to the electrical path between the second transistor T2 and the second diode 416. In addition, the other end of the first inductor is coupled to the electrical path between the second transistor T2 and the second diode 416. The third branch includes a third electronic switching device 424 coupled between a third AC input node 422 and the output node 430. The third electronic switching device 424 includes a series arrangement of a third transistor T3 coupled to a third diode 426, wherein one end of a third inductor 428 is coupled to the electrical path between the third transistor T3 and the third diode 426. The other end of the third inductor 428 is coupled to the electrical path between the first transistor T1 and the first diode 406 of the first electronic switching device 406. The output node 430 is electrically coupled to a first output terminal 434 and to one side of a capacitor 432. The other side of the capacitor 432 is coupled to a second output terminal 436 and to a neutral input node 434.

Overlooking the embodiment of the circuit arrangement 400 shown in FIG. 4 it may be seen that the underlying topology is based on the embodiment shown in FIG. 2, supplemented by a third branch involving the third transistor T3, the third diode (free wheeling diode) 426 and the two inductors 418, 428. In the circuit arrangement 400 shown in FIG. 4 the capacitor 432 may have a relatively small capacitance. In case of a low voltage (i.e. low power) on one of the three phases (e.g. the second AC input node 412), the load may be provided with sufficient power by the other two phases (e.g. the first AC input node 402 and the third AC input node 434). Compared with the single phase implementations of the circuit arrangement according to various embodiments as shown in FIGS. 2A and 2B and FIGS. 3A and 3B, the capacitor 432 may have a substantially smaller capacitance in the three phase implementation.

Figure 5A:
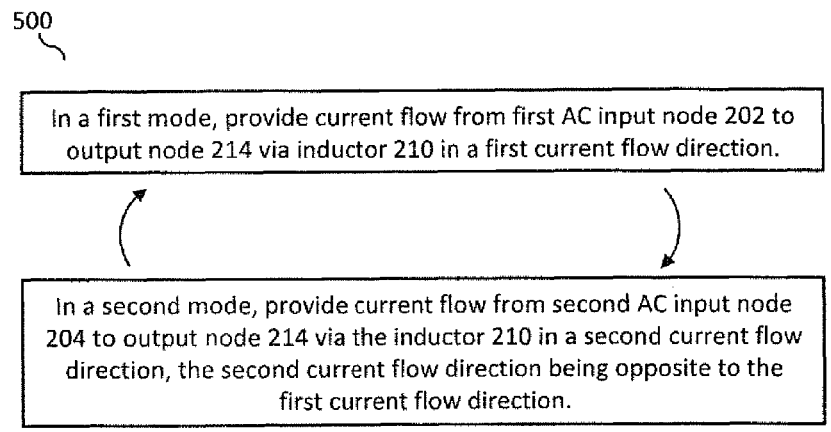
FIG. 5A shows a flow diagram illustrating the control method according to various embodiments for a circuit arrangement as described herein.

In FIG. 5A a flow diagram 500 is shown which depicts a control method for the circuit arrangement according to various embodiments. The method may be implemented by software or by hardware in the corresponding controller which drives the first electronic switching device and the second electronic switching device (and the fifth switch 260 and the sixth switch 262).

The method may include operating the circuit arrangement according to various embodiments in two modes. In the first mode, the method may include providing a current flow from the first AC input node 202 to the output node 214 via the inductor 210 in a first current flow direction through the inductor 210. In the second mode, the method may include providing a current flow from the second AC input node 204 to the output node 214 via the inductor 210 in a second current flow direction through the inductor 210, the second current flow direction being opposite to the first current flow direction. The different current flow direction through the inductor 210 in both modes results from the fact that the polarity of the AC input voltage applied to the first AC input terminal 202 the second AC input terminal 204 in the first mode is inverted with respect to the polarity of the AC input voltage applied to the first AC input terminal 202 the second AC input terminal 204 in the second mode. The operation of the circuit arrangement according to various embodiments may then be switched between the first mode and the second mode, the switching frequency corresponding to the frequency at which the polarity of the AC input voltage applied to the circuit arrangement according to various embodiments changes changes/alternates.

Figure 5B:
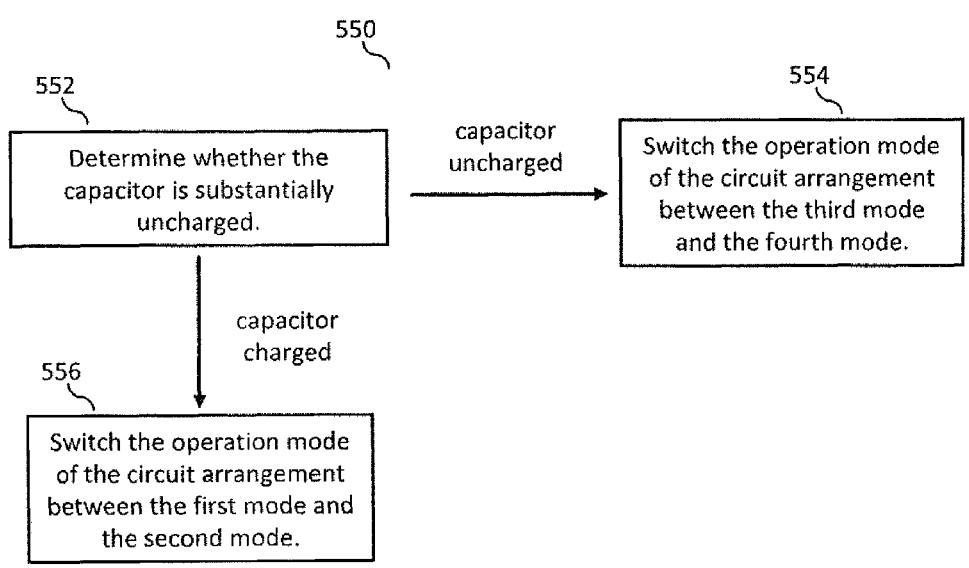
FIG. 5B shows a flow diagram illustrating a further embodiment of the control method for a circuit arrangement as described herein.

In FIG. 5B a flow diagram 550 is shown which illustrates a further embodiment of the method to control the circuit arrangement according to various embodiments is shown. The extended method depicted in FIG. 5B may be seen to include the method depicted in FIG. 5A. The extended method illustrated in FIG. 5B may include a step 552 of determining, whether the capacitor 210 is substantially charged or not. This may be performed, for example, by the controller 212, which may be configured to sample the voltage across the capacitor 264 and compare that voltage to the AC input voltage to determine the charge state of the capacitor 264. If it is determined that the capacitor 210 is substantially uncharged, i.e. its voltage is substantially smaller than the peak voltage of the AC input voltage, then the circuit arrangement according to various embodiments is operated in the third mode or in the fourth mode in a next step 554, wherein the operation of the circuit arrangement according to various embodiments may then be switched between the third mode and the fourth mode in accordance with the frequency at which the polarity of the AC input voltage applied to the circuit arrangement is changing/alternating. On the other hand, if it is determined that the capacitor 210 is substantially charged, i.e. its voltage is substantially equal to the peak voltage of the AC input voltage, then the circuit arrangement according to various embodiments is operated in the first mode or in the second mode in a next step 556, wherein the operation of the circuit arrangement according to various embodiments may then be switched between the first mode and the second mode in accordance with the frequency at which the polarity of the AC input voltage applied to the circuit arrangement is changing/alternating.

In accordance with various embodiments, a circuit arrangement is provided including a first AC input node and a second AC input node; a first electronic switching device coupled between the first AC input node and an output node; a second electronic switching device coupled between the second AC input node and the output node; an inductor coupled between the first electronic switching device and the second electronic switching device; a controller configured to control the first electronic switching device and the second electronic switching device to, in a first mode, provide a first current path from the first AC input node to the output node via the inductor in a first current flow direction through the inductor, and, in a second mode, provide a second current path from the second AC input node to the output node via the inductor in a second current flow direction through the inductor, the second current flow direction being different from the first current flow direction.

According to further embodiments of the circuit arrangement, the first electronic switching device may include a first switch and a second switch coupled in series.

According to further embodiments of the circuit arrangement, one side of the inductor may be coupled to the electrical path between the first switch and the second switch.

According to further embodiments of the circuit arrangement, the first switch may include a transistor.

According to further embodiments of the circuit arrangement, the first switch may be configured as a bidirectionally isolating switch.

According to further embodiments the first switch may include two transistors coupled in series with their same terminals coupled with one another, i.e. with their drain terminals coupled with one another or with their source terminals coupled with one another.

According to further embodiments of the circuit arrangement, the first switch may include two field effect transistors coupled in series with a common drain or a common source.

According to further embodiments of the circuit arrangement, the first switch may include a trench extended drain field effect transistor or an elongated gate field effect transistor.

According to further embodiments of the circuit arrangement, the second switch may include a diode arranged such that a current flow towards the output node is permitted in the second mode.

According to further embodiments of the circuit arrangement, the second switch may include a transistor driven by the controller such that a current flow towards the output node is permitted in the second mode.

According to further embodiments of the circuit arrangement, the controller may be configured to control the first electronic switching device and the second electronic switching device such that, in the first mode, the first current path is provided through the first switch and a part of the second electronic switching device.

According to further embodiments of the circuit arrangement, the second electronic switching device may include a third switch and a fourth switch coupled in series and the controller may be configured to control the first electronic switching device and the second electronic switching device such that, in the first mode, the first current path is provided through the first switch and either through the third switch or through the fourth switch.

According to further embodiments of the circuit arrangement, the second electronic switching device may include a third switch and a fourth switch coupled in series.

According to further embodiments of the circuit arrangement, the other side of the inductor may be coupled to the electrical path between the third switch and the fourth switch.

According to further embodiments of the circuit arrangement, the third switch may include a transistor.

According to further embodiments of the circuit arrangement, the third switch may be configured as a bidirectionally isolating switch.

According to further embodiments of the circuit arrangement, the third switch may include two transistors coupled in series with their same terminals coupled with one another.

According to further embodiments of the circuit arrangement, the third switch may include two field effect transistors coupled in series with a common drain or a common source.

According to further embodiments of the circuit arrangement, the third switch may include a trench extended drain field effect transistor or an elongated gate field effect transistor.

According to further embodiments of the circuit arrangement, the fourth switch may include a diode arranged such that a current flow towards the output node is permitted in the first mode.

According to further embodiments of the circuit arrangement, the fourth switch may include a transistor driven by the controller such that a current flow towards the output node is permitted in the first mode.

According to further embodiments of the circuit arrangement, the controller may be configured to control the first electronic switching device and the second electronic switching device to, in the second mode, provide the second current path through the third switch and a part of the first electronic switching device.

According to further embodiments of the circuit arrangement, the first electronic switching device may include a first switch and a second switch coupled in series and the controller may be configured to control the first electronic switching device and the second electronic switching device to, in the second mode, provide the second current path through the third switch and either through the first switch or through the second switch.

According to further embodiments of the circuit arrangement, the circuit arrangement may further include a capacitor coupled between the output node and a further node.

According to further embodiments of the circuit arrangement, the circuit arrangement may further include a fifth switch coupled between the further node and the first AC input node; and a sixth switch coupled between the further node and the second AC input node.

According to further embodiments of the circuit arrangement, the fifth switch and/or the sixth switch may include a diode arranged such that a current flow towards the first AC input node in the second mode and towards the second AC input node in the first mode is permitted.

According to further embodiments of the circuit arrangement, the controller may be configured to control the fifth switch such that, in the second mode, a current path between the further node and the first AC input node is provided through the fifth switch.

According to further embodiments of the circuit arrangement, the controller may be configured to control the sixth switch such that, in the first mode, a current path between the further node and the second AC input node is provided through the sixth switch.

According to further embodiments of the circuit arrangement, the controller may be further configured to control the first electronic switching device and the second electronic switching device to, in a third mode, provide a third current path from the first AC input node through the first electronic switching device to the output node bypassing the inductor; and in a fourth mode, provide a fourth current path from the second AC input node through the second electronic switching device to the output node bypassing the inductor.

According to further embodiments of the circuit arrangement, the controller may be further configured to drive the first electronic switching device in a clocked manner in the third mode.

According to further embodiments of the circuit arrangement, the controller may be further configured to deactivate the second switching device in the third mode.

According to further embodiments of the circuit arrangement, the controller may be further configured to drive the second electronic switching device in a clocked manner in the fourth mode.

According to further embodiments of the circuit arrangement, the controller may be further configured to deactivate the first switching device in the fourth mode.

According to further embodiments of the circuit arrangement, the controller may be configured to operate the circuit arrangement in the first mode when the potential at the first AC input node is larger than the potential at the second AC input node.

According to further embodiments of the circuit arrangement, the controller may be configured to operate the circuit in the second mode when the potential at the first AC input node is smaller than the potential at the second AC input node.

According to further embodiments of the circuit arrangement, the circuit arrangement may further include a capacitor coupled to the output node, wherein the controller may be configured to operate the circuit arrangement in the third mode when the potential at the first AC input node is larger than the potential at the second AC input node and the voltage across the capacitor is smaller than a peak voltage between the first AC input node and the second AC input node.

According to further embodiments of the circuit arrangement, the circuit arrangement may further include a capacitor coupled between the output node and a further node, wherein the controller may be configured to operate the circuit in the fourth mode when the potential at the first AC input node is smaller than the potential at the second AC input node and the voltage across the capacitor is smaller than a peak voltage between the first AC input node and the second AC input node.

According to further embodiments of the circuit arrangement, the controller may be further configured to switch between the first mode and the second mode with a frequency corresponding to the frequency of the AC voltage applied between the first AC input node and the second AC input node and to switch between the second mode and the first mode with a frequency corresponding to the frequency of the AC voltage applied between the first AC input node and the second AC input node. In other words, the controller may be configured to switch between any two modes of the first mode and the second mode with a frequency corresponding to twice the frequency of the AC voltage applied between the first AC input node and the second AC input node.

In accordance with various embodiments, a circuit arrangement is provided, the circuit arrangement having a first AC input terminal and a second AC input terminal; a first switching device coupled between the first AC input terminal and an output terminal; a second switching device coupled between the second AC input terminal and the output terminal; an inductor coupled between the first switching device and the second switching device; a controller coupled to and configured to control the first switching device and the second switching device to, in a first mode, provide a first current path between the first AC input terminal and the output terminal through the inductor such that a current flows through the inductor in a first direction, and, in a second mode, provide a second current path between the second AC input terminal and the output terminal through the inductor such that the current flows through the inductor in a second direction, the second direction being opposite to the first direction.

In accordance with various embodiments, a control method for a circuit arrangement is provided, the circuit arrangement comprising a first AC input node and a second AC input node; a first electronic switching device coupled between the first AC input node and an output node; a second electronic switching device coupled between the second AC input node and the output node; an inductor coupled between the first electronic switching device and the second electronic switching device, wherein the control method includes, in a first mode, providing a current flow from the first AC input node to the output node via the inductor in a first current flow direction through the inductor, and, in a second mode, providing a current flow from the second AC input node to the output node via the inductor in a second current flow direction through the inductor, the second current flow direction being opposite to the first current flow direction.

According to further embodiments, the method may further include activating, in the first mode, a first switch of the first electronic switching device, the first switch of the first electronic switching device being coupled to a second switch of the first electronic switching device and to one side of an inductor.

According to further embodiments, the method may further include activating, in the first mode, a first switch of the first electronic switching device, the first switch of the first electronic switching device being coupled to a second switch of the first electronic switching device and to one side of the inductor.

According to further embodiments, the method may further include activating, in the first mode, a second switch of the second electronic switching device, the second switch of the second electronic switching device being coupled to a first switch of the second electronic switching device and to the other side of the inductor.

According to further embodiments, the method may further include, in the first mode, guiding the current flow from the first AC input node through the output node to the second AC input node for a certain period of time by deactivating the first switch of the second electronic switching device.

According to further embodiments, the method may further include activating, in the second mode, a first switch of the second electronic switching device, the first switch of the second electronic switching device being coupled to a second switch of the second electronic switching device and to another side of the inductor.

According to further embodiments, the method may further include activating, in the second mode, a second switch of the first electronic switching device, the second switch of the first electronic switching device being coupled to a first switch of the first electronic switching device and to one side of the inductor.

According to further embodiments, the method may further include, in the second mode, guiding the current flow from the second AC input node through the output node to the first AC input node by deactivating the first switch of the first electronic switching device.

According to further embodiments, the method may further include switching between the first mode and the second mode with a frequency corresponding to the frequency of the AC voltage applied between the first AC input node and the second AC input node and switching between the second mode and the first mode with a frequency corresponding to the frequency of the AC voltage applied between the first AC input node and the second AC input node. In other words, the method may include switching between any two modes of the first mode and the second mode with a frequency corresponding to twice the frequency of the AC voltage applied between the first AC input node and the second AC input node.

According to further embodiments, the method may further include operating the circuit arrangement in the first mode when the potential at the first AC input node is larger than the potential at the second AC input node.

According to further embodiments, the method may further include operating the circuit arrangement in the second mode when the potential at the first AC input node is smaller than the potential at the second AC input node.

According to further embodiments, the method may further include, in a third mode, providing a current flow from the first AC input node through the first electronic switching device to the output node bypassing the inductor, and, in a fourth mode, providing a current flow from the second AC input node through the second electronic switching device to the output node bypassing the inductor.

According to further embodiments of the method, the first electronic switching device may be operated in a clocked manner in the third mode.

According to further embodiments of the method, the second electronic switching device may be operated in a clocked manner in the fourth mode.

According to further embodiments of the method, the circuit arrangement may be operated in the third mode when the potential at the first AC input node is larger than the potential at the second AC input node and the voltage across a capacitor coupled to the output node is smaller than a peak voltage between the first AC input node and the second AC input node.

According to further embodiments of the method, the circuit arrangement may be operated in the fourth mode when the potential at the first AC input node is smaller than the potential at the second AC input node and the voltage across a capacitor coupled to the output node is smaller than a peak voltage between the first AC input node and the second AC input node.

While the inventive concept has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
a first AC input node and a second AC input node;
a first electronic switching device coupled between the first AC input node and an output node;
a second electronic switching device coupled between the second AC input node and the output node;
an inductor coupled between the first electronic switching device and the second electronic switching device;
a controller configured to control the first electronic switching device and the second electronic switching device to
in a first mode, provide a first current path from the first AC input node to the output node via the first electronic switching device and the inductor, in a first current flow direction through the inductor; and
in a second mode, provide a second current path from the second AC input node to the output node via the second electronic switching device and the inductor, in a second current flow direction through the inductor, the second current flow direction being different from the first current flow direction.

2. The circuit arrangement of claim 1,
wherein the first electronic switching device includes a first switch and a second switch coupled in series.

3. The circuit arrangement of claim 2,
wherein the first switch comprises a transistor.

4. The circuit arrangement of claim 2,
wherein the first switch is configured as a bidirectionally isolating switch.

5. The circuit arrangement of claim 2,
wherein the controller is configured to control the first electronic switching device and the second electronic switching device such that, in the first mode, the first current path is provided through the first switch and a part of the second electronic switching device.

6. The circuit arrangement of claim 5,
wherein the second electronic switching device comprises a third switch and a fourth switch coupled in series; and
wherein the controller is configured to control the first electronic switching device and the second electronic switching device such that, in the first mode, the first current path is provided through the first switch and either through the third switch or through the fourth switch.

7. The circuit arrangement of claim 1, further comprising:
a capacitor coupled between the output node and a further node.

8. The circuit arrangement of claim 7, further comprising:
a fifth switch coupled between the further node and the first AC input node; and
a sixth switch coupled between the further node and the second AC input node.

9. The circuit arrangement of claim 1,
wherein the controller is further configured to control the first electronic switching device and the second electronic switching device to
in a third mode, provide a third current path from the first AC input node through the first electronic switching device to the output node bypassing the inductor; and
in a fourth mode, provide a fourth current path from the second AC input node through the second electronic switching device to the output node bypassing the inductor.

10. The circuit arrangement of claim 9,
wherein the controller is further configured to drive the first electronic switching device in a clocked manner in the third mode.

11. The circuit arrangement of claim 9,
wherein the controller is further configured to deactivate the second switching device in the third mode.

12. The circuit arrangement of claim 9,
wherein the controller is further configured to drive the second electronic switching device in a clocked manner in the fourth mode.

13. The circuit arrangement of claim 9,
wherein the controller is further configured to deactivate the first switching device in the fourth mode.

14. The circuit arrangement of claim 1,
wherein the controller is configured to operate the circuit arrangement in the first mode when the potential at the first AC input node is larger than the potential at the second AC input node.

15. The circuit arrangement of claim 1,
wherein the controller is configured to operate the circuit in the second mode when the potential at the first AC input node is smaller than the potential at the second AC input node.

16. A circuit arrangement, comprising:
a first AC input terminal and a second AC input terminal;
a first switching device coupled between the first AC input terminal and an output terminal;
a second switching device coupled between the second AC input terminal and the output terminal;
an inductor coupled between the first switching device and the second switching device;
a controller coupled to and configured to control the first switching device and the second switching device to
in a first mode, provide a first current path between the first AC input terminal and the output terminal through the first switching device and the inductor such that a current flows through the inductor in a first direction; and
in a second mode, provide a second current path between the second AC input terminal and the output terminal through the second switching device and the inductor such that the current flows through the inductor in a second direction, the second direction being opposite to the first direction.

17. A method for controlling a circuit arrangement,
the circuit arrangement comprising:
a first AC input node and a second AC input node;
a first electronic switching device coupled between the first AC input node and an output node;

a second electronic switching device coupled between the second AC input node and the output node;
an inductor coupled between the first electronic switching device and the second electronic switching device;

the method comprising:
in a first mode, providing a current flow from the first AC input node to the output node via the first electronic switching device and the inductor, in a first current flow direction through the inductor; and
in a second mode, providing a current flow from the second AC input node to the output node via the second electronic switching device and the inductor, in a second current flow direction through the inductor, the second current flow direction being opposite to the first current flow direction.

18. The method of claim 17, further comprising:
activating, in the first mode, a first switch of the first electronic switching device, the first switch of the first electronic switching device being coupled to a second switch of the first electronic switching device and to one side of the inductor.

19. The method of claim 17, further comprising:
activating, in the first mode, a second switch of the second electronic switching device, the second switch of the second electronic switching device being coupled to a first switch of the second electronic switching device and to the other side of the inductor.

20. The method of claim 17, further comprising:
activating, in the second mode, a first switch of the second electronic switching device, the first switch of the second electronic switching device being coupled to a second switch of the second electronic switching device and to another side of the inductor.

21. The method of claim 17, further comprising:
activating, in the second mode, a second switch of the first electronic switching device, the second switch of the first electronic switching device being coupled to a first switch of the first electronic switching device and to one side of the inductor.

22. The method of claim 21, further comprising:
in the second mode, guiding the current flow from the second AC input node through the output node to the first AC input node by deactivating the first switch of the first electronic switching device.

23. The method of claim 21, further comprising:
switching between the first mode and the second mode with a frequency corresponding to the frequency of the AC voltage applied between the first AC input node and the second AC input node; and
switching between the second mode and the first mode with a frequency corresponding to the frequency of the AC voltage applied between the first AC input node and the second AC input node.

24. The method of claim 21, further comprising:
operating the circuit arrangement in the first mode when the potential at the first AC input node is larger than the potential at the second AC input node.

25. The method of claim 21, further comprising:
operating the circuit arrangement in the second mode when the potential at the first AC input node is smaller than the potential at the second AC input node.

* * * * *